(12) United States Patent
Bruemmer et al.

(10) Patent No.: US 6,375,136 B1
(45) Date of Patent: Apr. 23, 2002

(54) TUBE MOUNTING FOR A WINDSHIELD WIPER SYSTEM

(75) Inventors: Dietmar Bruemmer, Buehlertal; Kurt Muehlpforte; Jan Dietrich, both of Buehl; Andreas Wiegert, Kappelrodeck, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/446,707

(22) PCT Filed: Apr. 24, 1999

(86) PCT No.: PCT/DE99/01230

§ 371 Date: Mar. 14, 2000

§ 102(e) Date: Mar. 14, 2000

(87) PCT Pub. No.: WO99/55562

PCT Pub. Date: Nov. 4, 1999

(30) Foreign Application Priority Data

Apr. 29, 1998 (DE) .......................................... 198 19 181
Aug. 6, 1998 (DE) .......................................... 198 35 552

(51) Int. Cl.⁷ ................................................. B60S 1/04
(52) U.S. Cl. ......................... 248/200; 248/743; 74/42; 15/250.25
(58) Field of Search .............................. 248/200, 309.1, 248/231.81, 230.7, 74.3; 74/42; 15/250.25, 250.31

(56) References Cited

U.S. PATENT DOCUMENTS 3,263,948 A  *  8/1966  Conrad ........................ 248/74.3
3,463,440 A  *  8/1969  Libby, Jr. .................... 248/487
4,183,114 A  *  1/1980  Eden ........................ 15/250.25
5,222,706 A  *  6/1993  Hoshino ....................... 248/200
5,396,681 A  *  3/1995  Hara ........................ 15/250.31
5,593,125 A  *  1/1997  Storz et al. ................. 248/316.5
5,873,280 A  *  2/1999  Kanagawa ....................... 74/42
5,956,800 A  *  9/1999  Morin et al. ................ 15/250.31

FOREIGN PATENT DOCUMENTS

| DE | 74 34 119    |   | 2/1975 |
| DE | 197 12 113 A |   | 9/1998 |
| EP | 0 484 175 A  |   | 5/1992 |
| EP | 0 409 944 B1 |   | 5/1993 |
| EP | 0 689 975 A  |   | 1/1996 |
| EP | 0 781 691 A1 |   | 7/1997 |
| FR | 2721885      | * | 6/1994 |

* cited by examiner

Primary Examiner—Anita King
(74) Attorney, Agent, or Firm—Michael J. Striker

(57) ABSTRACT

The invention is based on a tube mounting (10) having a motor mounting (14, 46), the latter having an opening (16) for a gear dome (40) as well as screw holes (18) disposed around the dome and an indentation (20, 52) in which a mounting tube (12, 50) is embedded and retained. It is proposed that the motor mounting (14, 46) is a shaped sheet-metal part, and the indentation (20, 52) extends between at least one screw hole (18) and the opening (16) for the gear dome (40), and adjacent to the opening (16) and transversely to the indentation (20, 52), a tab (24, 48) is cut out, which is curved contrary to the indentation (20, 52) and surrounds the mounting tube (12, 50).

9 Claims, 2 Drawing Sheets

TUBE MOUNTING FOR A WINDSHIELD WIPER SYSTEM

BACKGROUND OF THE INVENTION

The invention is based on a tube mounting. Such tube mountings are used in particular in wiper systems for motor vehicles.

There, they are secured by a wiper carrier, known as a tube mounting, to the body of a motor vehicle. The mounting includes a motor mounting, which carries a wiper drive mechanism with a wiper motor and a gear mounted on it. A power takeoff shaft of the gear is supported in a gear dome and, as a rule via a crank and connecting rods, it drives cranks that are solidly connected to a drive shaft for each wiper. The gear housing is as a rule screwed with three screws to the motor mounting, which is held by a mounting tube. The screws, which are distributed about the gear dome and are inserted through screw holes in the motor mounting, engage existing screw supports of a housing cap on the power takeoff side. The screw supports brace the gear housing on the motor mounting.

The drive shaft of the wiper is supported in a wiper bearing, whose bearing housing is secured to or formed onto the ends of the mounting. The mounting is secured directly to a vehicle body via the bearing housing or via fastening eyelets that are formed onto the bearing housing, the mounting, and/or the motor mounting.

From German Utility Model DE-GM 74 34 119, a tube mounting is known that is made from a square tube to which a plate acting as the motor mounting is welded. Such tube mountings or tubular frame systems are highly stable despite their lightweight construction. For cost reasons, the goal is a straight carrier tube, because then no preliminary bending work is needed.

From European Patent Disclosure EP 04 09 944 B1, a tube mounting is also known in which a motor mounting connects tubular parts via positive connections. A variant shows that the motor mounting can be embodied integrally with a housing cap of the gear housing.

European Patent Disclosure EP 0 781 691 A1 shows a tube mounting with a motor mounting and a mounting tube. On the side toward the mounting tube, the motor mounting has an indentation in which the mounting tube is embedded and is joined, the one located over the other, by means of projection welding. The cross-sectional contour of the indentation corresponds to the cross-sectional contour of the mounting tube and surrounds the mounting tube over a circumferential range of approximately 180. Since the motor mounting is thus joined to the mounting tube over only a few points on only one side of the mounting tube, the forces occurring in wiper operation are unfavorably distributed to the connection between the two components, so that locally high material stresses occur. Furthermore, because of the spacing between the mounting tube and the power takeoff shaft, considerable bending moments arise.

From European Patent Disclosure EP 0 689 975 A1, a tube mounting with a motor mounting is also known. It comprises two parts embodied in mirror symmetry, which on the side toward a mounting tube have indentations in which the mounting tube is embedded. The indentations each surround the mounting tube over a circumferential range of approximately 180, so that the two indentations together surround the mounting tube over its entire circumference. Upon assembly, both parts of the motor mounting are placed around the mounting tube and joined together, for instance mechanically or by adhesive bonding or by a thermal connection. The mounting tube is fixed relative to the motor mounting circumferentially and axially positively and/or materially by adhesive bonding. The two parts of the motor mounting can also, in one embodiment, be combined into a single piece. Once again, the spacing between the power takeoff shaft and the mounting tube is considerable.

SUMMARY OF THE INVENTION

The tube mounting has the advantage that the mounting tube is enclosed on both sides, and the incident forces are distributed not only via the indentation but also via the tab to the surface of the motor mounting. This is possible because the indentation does not extend along the edge of the motor mounting but rather traverses it. As a result, the latch can be cut out inside the motor mounting and can aid in distributing the force of flow to multiple sides of the indentation.

According to the invention, the motor mounting is a shaped sheet-metal part. The indentation preferably extends between at least one screw hole and the opening for the gear dome. As a result, the mounting tube is located near the power takeoff shaft of the gear, so that only slight bending moments occur. Adjacent to the opening for the gear dome and transversely to the indentation, a tab is cut out, which is curved contrary to the indentation and encloses the mounting tube. As a result, the mounting tube is retained over virtually its entire circumference. The forces that arise in wiper operation are thus distributed in the region of the gear dome over a large circumferential region of the mounting tube, and purely bending stresses are partly converted into tensile and compressive stresses. Despite the favorable induction of force, the motor mounting has a simple design and comprises a single piece, which has no undercuts or double-walled regions and can be made as a part shaped by bending.

The motor mounting and the tab in alternation surround the mounting tube from opposite sides, and the individual regions are relatively narrow in comparison to the total connection region. As a result, they can be joined to the mounting tube simply and in controlled fashion positively by adhesive bonding or welding, for instance projection welding.

To increase the strength, it is expedient to reinforce the material connection with a positive connection, for instance by giving the mounting tube and the corresponding indentation in the motor mounting and/or the tab a cross section other than a circular cross section. To increase the strength, slits whose ends are rounded are also provided laterally of the tab. As a result, the notch stress is reduced, and stress and fatigue cracks in these regions are avoided.

BRIEF DESCRIPTION OF THE DRAWINGS

Further advantages will become apparent from the ensuing description of the drawing. Exemplary embodiments of the invention are shown in the drawing. The drawing, description and claims include numerous characteristics in combination. One skilled in the art will expediently also consider the characteristics individually and combine them into suitable further combinations.

Shown are.

DESCRIPTION OF THE PREFERRED EMBODIMENTS

Figure 1:
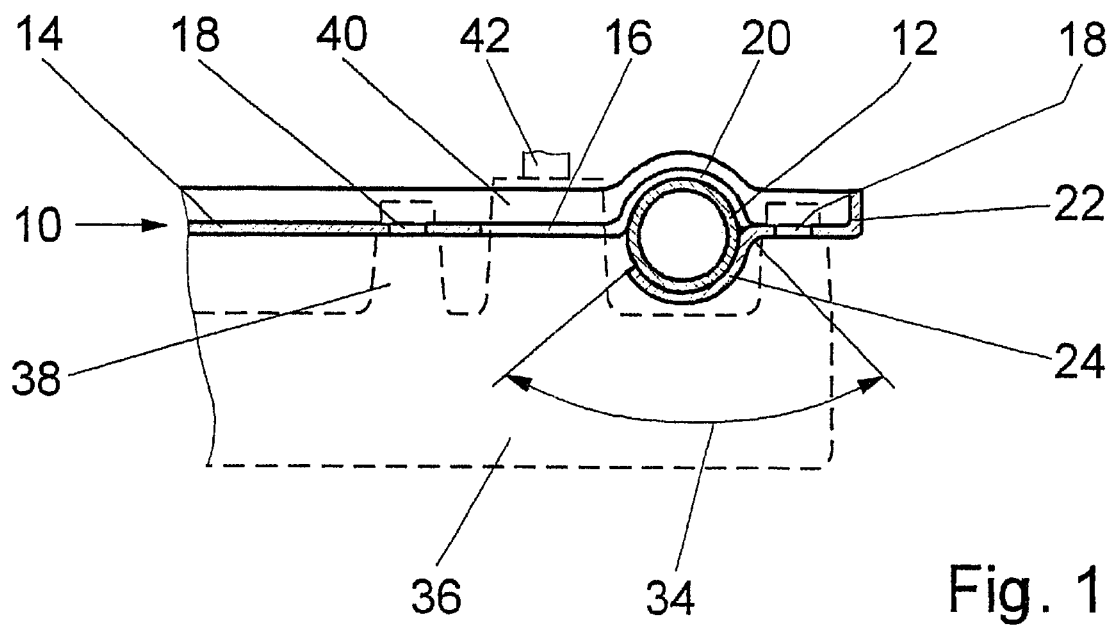
FIG. 1, a cross section through a motor mounting, secured to a mounting tube, taken along the line I—I in FIG. 2.

A tube mounting 10 includes a mounting tube 12 and a motor mounting 14 secured to the latter. The motor mounting has an opening 16, through which a geared dome 40 of a gear 36 is inserted. A power takeoff shaft 42 is supported in the gear dome 40. The contour of the gear 36, which is flanged to a wiper motor, not identified by reference numeral, is suggested by dashed lines. It is secured to the motor mounting 14, 46 with screws. Screw holes 18 are used for this purpose, being distributed around the opening 16 for the gear dome 40. The motor mounting 14, 46 is a shaped sheet-metal part, whose edge 22 is bent upward to form a reinforcing rib.

Extending between the opening 16 for the gear dome 40 and at least one screw hole 18 is an indentation 20, 52, in which the mounting tube 12, 50 is embedded. The tab 24, 48 is cut out adjacent to the opening 16, transversely to the indentation 20, 52. It is curved contrary to the indentation 20, 52 and surrounds the mounting tube 12, 50 from the side opposite the indentation 20, 52.

The mounting tube 12, 50 is joined materially to the motor mounting 14, 46, for instance by adhesive bonding or welding. For projection welding, the version shown in FIG. 2 has welding projections 44 in the region of the indentation 20 and of the tab 24. The edge 22 is located on the side of the motor mounting 14, 46 opposite the tab 24 and protrudes past the closed side of the indentation 20, 52.

The tab 24 is cut out and shaped from the sheet metal of the motor mounting 14, 46. In the process, at least some of the sheet metal from the region of the opening 16 for the gear dome 40 is used. Laterally of the tab 24, slits 26 and 28 are provided, whose respective ends 30 and 32 are rounded, to avert the risk of stress cracks in these regions. A tab 24 is joined to the motor mounting 14, 46 on only one side and can be bent slightly in elastically resilient fashion so that the mounting tube 12, 50 can be installed. It subsequently rests nonpositively on the mounting tube 12, 50, which is thus favorable to subsequent welding.

Figure 2:
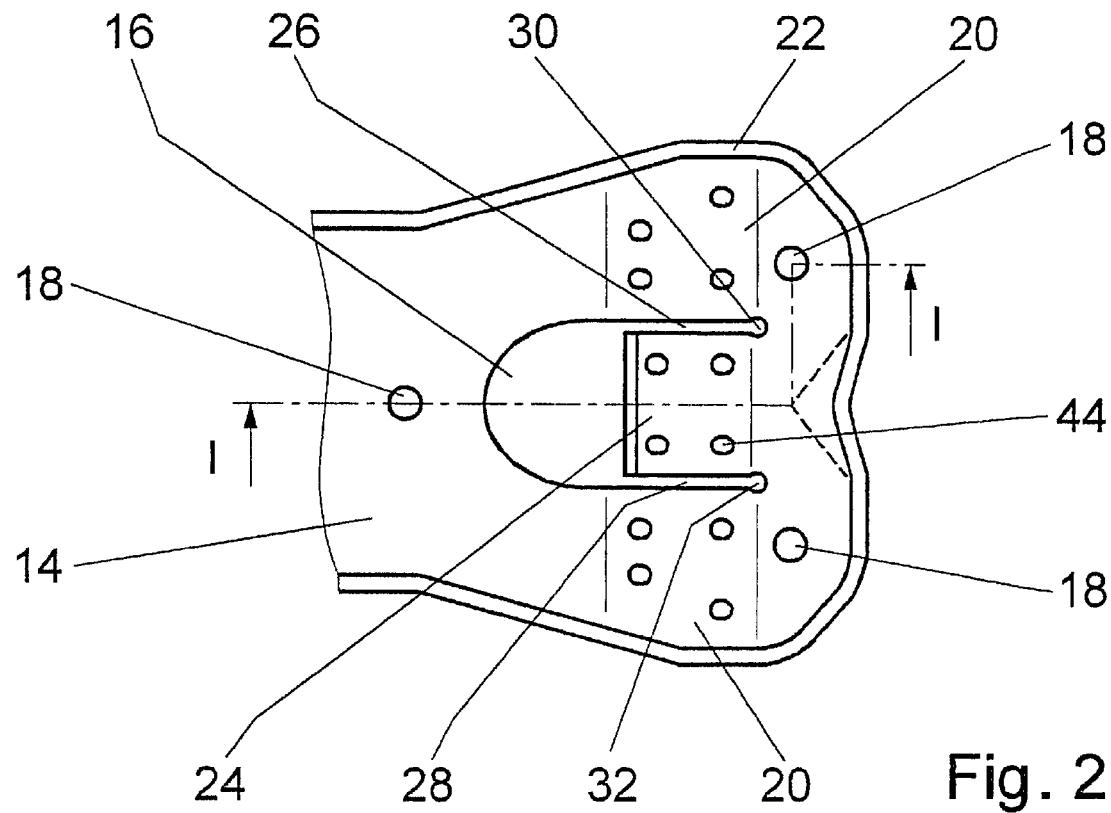
FIG. 2, a plan view on a motor mounting without a mounting tube.
Figure 3:
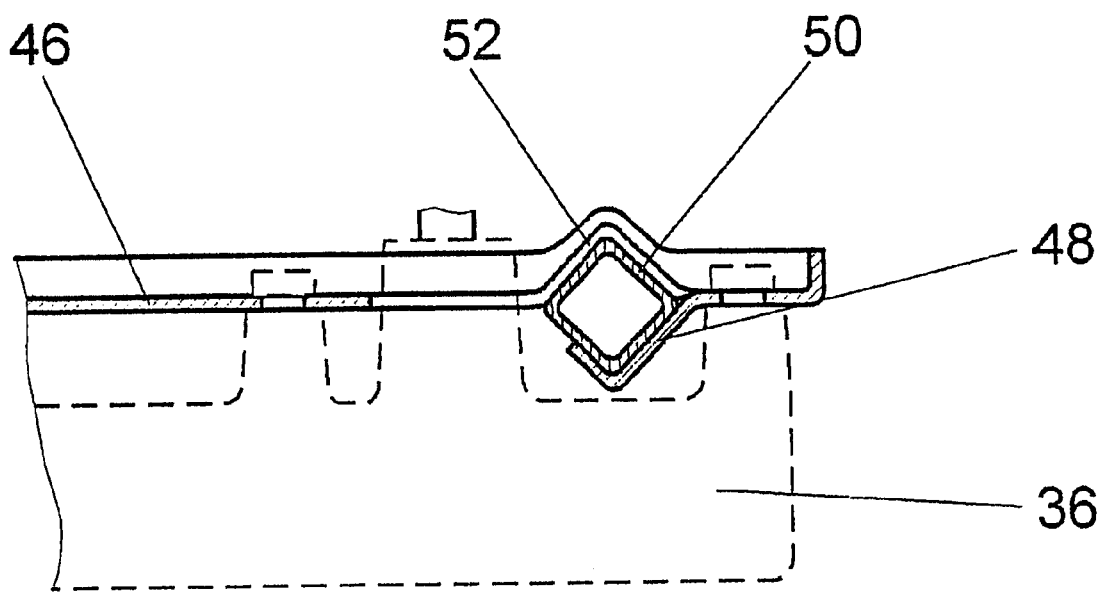
FIG. 3, a variant of FIG. 1 with a polygonal cross-sectional profile of the mounting tube.

The motor mounting 46 of FIG. 3 differs from the motor mounting 14 of FIGS. 1 and 2 in that the indentation 52, tab 48 and mounting tube 50 all have a polygonal cross-sectional contour. As a result, the motor mounting 46 is positively joined to the mounting tube 50. This connection can be reinforced with a material bond.

A further improvement in the flow of force, particularly for large motor mountings, can be obtained if a plurality of tabs are cut out (this is not shown). They can then preferably surround the mounting tube in alternation.

List of Reference Numerals

10 Tube mounting
12 Mounting tube
14 Motor mounting
16 Opening
18 Screw hole
20 Indentation
22 Edge
24 Tab
26 Slit
28 Slit
30 End
32 End
34 Region
36 Gear
38 Screw support
40 Gear dome
42 Power takeoff shaft
44 Weld projection
46 Motor mounting
48 Tab
50 Mounting tube
52 Indentation

What is claimed is:

1. A tube mounting (10), in particular for windshield wiper systems, having a motor mounting (14, 46) to which a motor gear unit (36) can be secured and which has a receptacle in the form of an indentation (20, 52), in which a mounting tube (12, 50) is embedded and retained, characterized in that the motor mounting (14, 46) is a shaped sheet-metal part; that the indentation (20, 52) traverse the motor mounting (14, 46); and that a tab (24, 48) is also cut out from the motor mounting (14, 46) transversely to the indentation (20, 52), which tab is curved contrary to the indentation (20, 52), and surrounds the mounting tube (12, 50).

2. The tube mounting (10) of claim 1, characterized in that the motor mounting has an opening (16) for a gear dome (40) of the gear unit (36) and has screw holes (18), disposed around this dome, for securing the gear unit (36); and that the indentation (20, 52) extends between at least one screw hole (18) and the opening (16) for the gear dome (40), and the tab (24, 48) is cut out adjacent to the opening (16).

3. The tube mounting (10) of one of claim 1, characterized in that the mounting tube (12) has a circular cross section and is surrounded by the tab (24) over a circumferential region.

4. The tube mounting (10) of claim 1, characterized in that the motor mounting (14, 46) is materially bonded to the mounting tube (12, 50).

5. The tube mounting (10) of claims 1, characterized in that the mounting tube (50) has a nonround cross section and is positively joined to the motor mounting (46).

6. The tube mounting (10) of claim 1, characterized in that the edge (22) of the motor mounting (14, 46) is curved upward toward the closed side of the indentation (20, 52).

7. The tube mounting (10) of claim 1, characterized in that the tab (24, 48) is embodied resiliently.

8. A tube mounting (10), in particular for windshield wiper systems, having a motor mounting (14, 46) to which a motor gear unit (36) can be secured and which has a receptacle in the form of an indentation (20, 52), in which a mounting tube (12, 50) is embedded and retained, characterized in that the motor mounting (14, 46) Is a shaped sheet-metal part; that the indentation (20, 52) traverse the motor mounting (14, 46); is a shaped sheet-metal part; that the indentation (20, 52) traverses the motor mounting (14, 46); and that a tab (24. 48) is also cut out transversely to the indentation (20, 52), which tab is curved contrary to the indentation (20, 52), and surrounds the mounting tube (12, 50), a motor mounting has an opening (16) for a gear dome (40) of the gear units (36) and the tab (24, 48) points with one free end toward the opening (16).

9. A tube mounting (10), in particular for windshield wiper systems, having a motor mounting (14, 46) to which a motor gear unit (36) can be secured and which has a receptacle in the form of an indentation (20, 52), in which a mounting tube (12, 50) is embedded and retained, characterized in that the motor mounting (14, 46) is a shaped sheet-metal part; that the indentation (20, 52) traverse the motor mounting (14, 46); is a shaped sheet-metal part; that the indentation (20, 52) traverses the motor mounting (14, 46); and that a tab (24, 48) is also cut out transversely to the indentation (20, 52), which tab is curved contrary to the indentation (20, 52), and surrounds the mounting tube (12, 50) and slits (26, 28) whose ends (30), 32) are rounded are located laterally of the tab (24, 48).

* * * * *